Oct. 9, 1928.
H. B. ELY
1,686,904
SOUND LOCATING APPARATUS
Filed Sept. 14, 1926   2 Sheets-Sheet 2
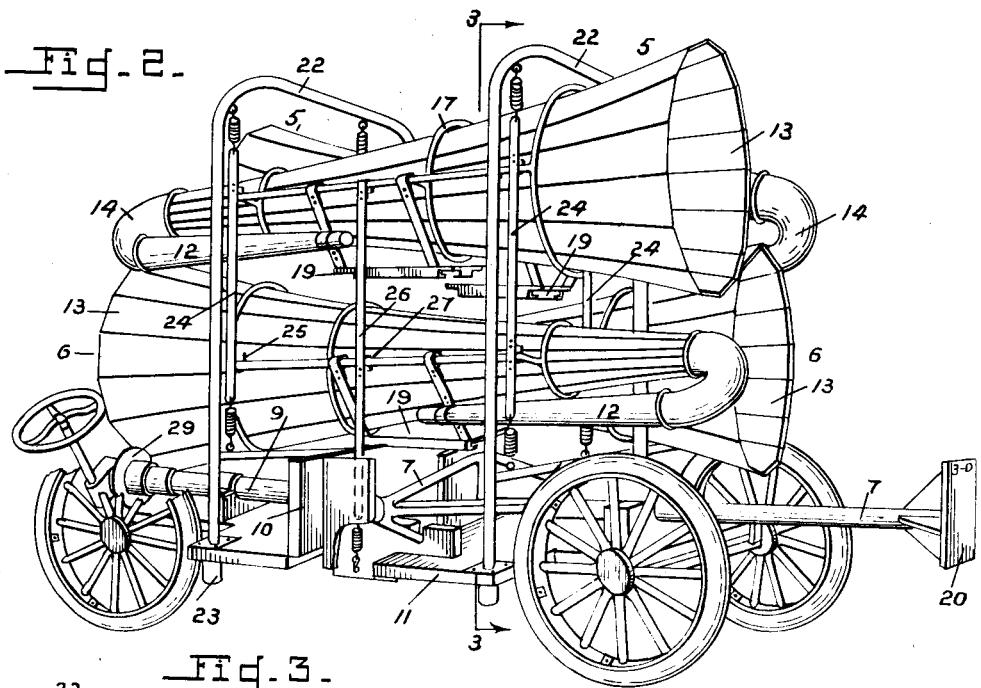
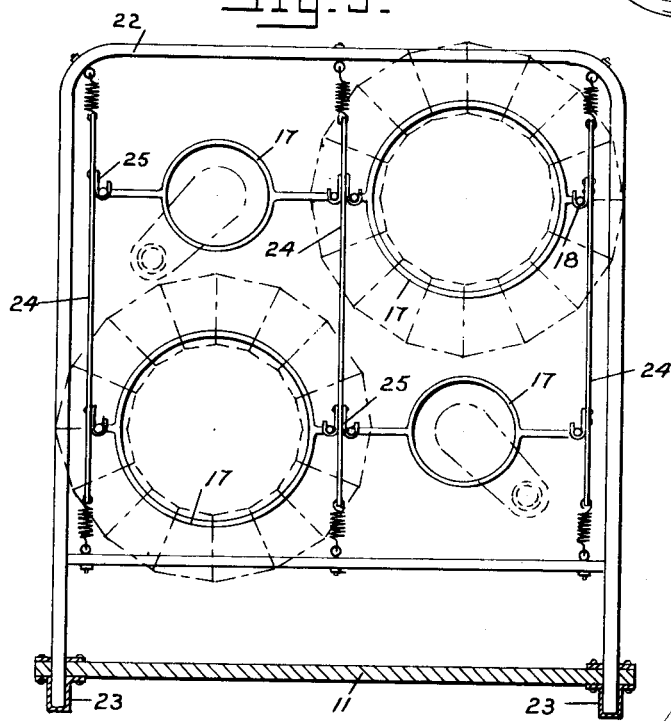
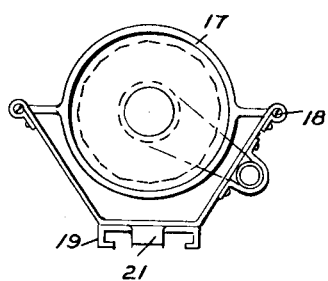
Inventor
Hiram B. Ely
By W. M. Roach
Attorney Patented Oct. 9, 1928.

1,686,904

UNITED STATES PATENT OFFICE.

HIRAM B. ELY, OF THE UNITED STATES ARMY, PHILADELPHIA, PENNSYLVANIA.

SOUND-LOCATING APPARATUS.

Application filed September 14, 1926. Serial No. 135,483.

(GRANTED UNDER THE ACT OF MARCH 3, 1883, AS AMENDED APRIL 30, 1928; 370 O. G. 757.)

The invention described herein may be manufactured and used by or for the Government for governmental purposes without the payment to me of any royalty thereon.

The subject of this invention is a sound locating apparatus.

The requirements of anti-aircraft firing demand that the information supplied by the sound locators be sufficiently accurate so that the cooperating search lights employing this data may be on the target when uncovered and the guns may open fire before the airplane can deviate from its course.

In order to obtain such efficiency the acoustic receivers of the present invention are horns whose profile is the curve of the simple exponential equation, the rate of change of the diameter being uniform, thus reducing reflection and consequent loss of sound energy while giving a maximum concentration or amplification. The amount of sound being reflected will be uniform and the consequent disturbances to the entire system will also be uniform and at a minimum.

Another provision making for efficiency consists in increasing the effective length of the horn by doubling back the apical portion and attaching a flexible tube following the exponential form.

In order that the apparatus may be used as a mobile field instrument the parts are arranged to facilitate dismounting and a novel wheeled mount is provided for compactly carrying the unit.

With these and other objects in view which will appear as the description proceeds, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 2 is a perspective showing the unit dismounted and ready for transportation;

Fig. 3 is a sectional view on the line 3—3 of Fig. 2;

Fig. 5 is a sectional view on the line 5—5 of Fig. 4.

Figure 1:
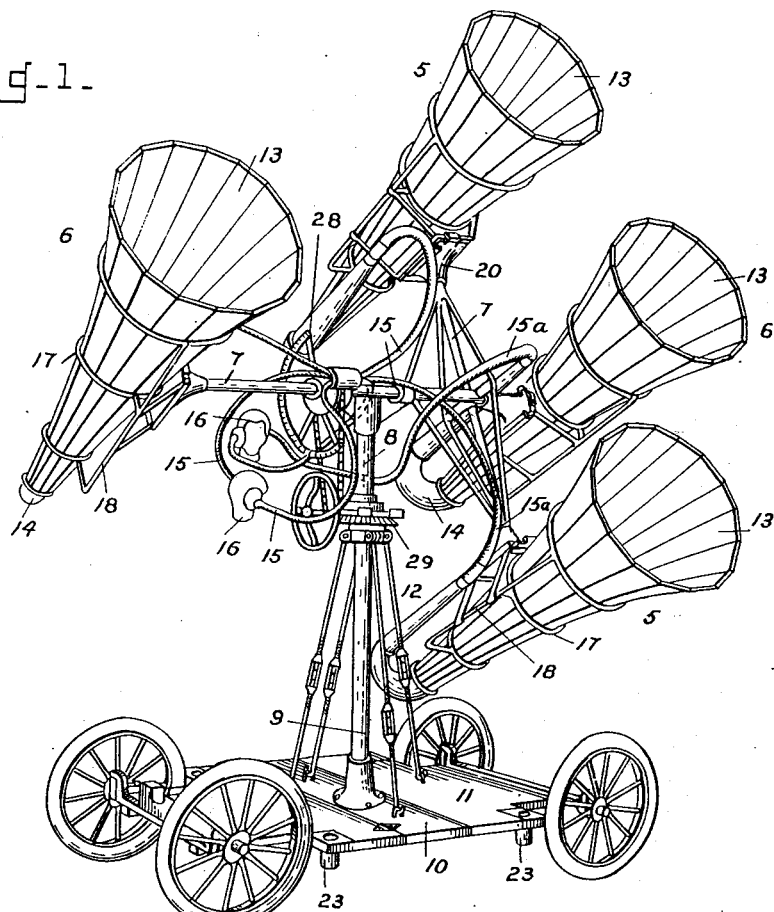
Fig. 1 is a perspective of a sound locating apparatus constructed in accordance with the invention and mounted ready for use.
Figure 4:
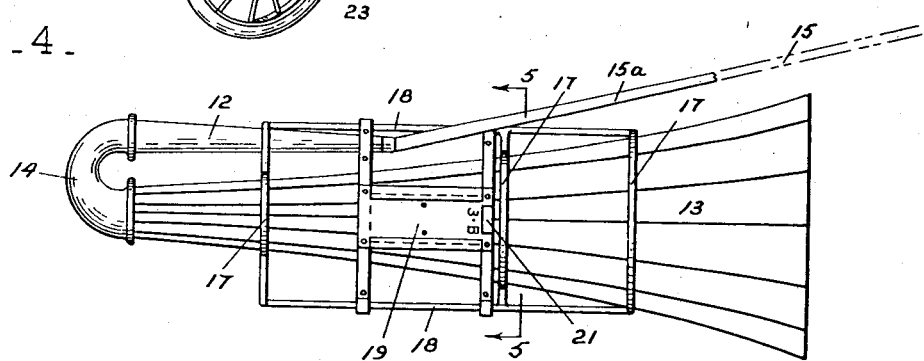
Fig. 4 is a detail view in elevation of one of the horns.

Referring to the drawings by numerals of reference:

The sound locating apparatus is of the so-called "trumpet" type operating according to the system of binaural comparison in which the apparatus is directed at the source of sound, when the listener having reduced the phase difference to zero, will receive the sound impulse in phase.

Specifically the apparatus consists of four large horns rigidly interconnected in parallel and arranged in two combinations on intersecting base lines, one such combination comprising the horns 5—5 for determining azimuth, and the other comprising the horns 6—6 for determining elevation.

The horns are carried on a cross-arm support 7, the fixed horizontal axis of which is trunnioned in a pintle 8 insertable in a pedestal 9 which is secured to a hinged base 10 forming part of the platform of a wheeled mount 11.

The horns are identical in all respects, and while they may be assembled to the support interchangeably, they are preferably provided with identification marks for the purpose of uniform mounting. The horns are made up into rigid units of three sections, the apex 12 doubled back against the mouth section 13 and these two are joined by a curved intermediate section 14. Throughout its entire length the horn has a profile which is the curve of the simple exponential equation, the rate of change of the diameter being uniform. The form of the equation used in determining the design of the horn is $\alpha = \alpha_o e^{mx}$ in which $\alpha$ is the cross sectional area at any point;

$\alpha_o$ is the cross sectional area at a small end;

$x$ is the abscissæ measured along the horn axis from the small end as an origin;

$m$ is a constant determined by the rate of flare desired;

$e$ is the base of Naperian system of logarithms.

Attached to the apex of the horn is a flexible tube 15 leading to a head set 16 which also receives the tube from the companion horn of the particular set. A portion $15^a$ of this tube approximately equal in length to the reversely bent apical portion constitutes the fourth section of the horn and follows the exponential form, the whole structure thus providing an effective length substantially double the length of the main or mouth section of the horn.

In order to facilitate mounting of the horns both in position of use and of travel they are each embraced by a cradle consisting of three rings 17 joined by side bars 18 and carrying a saddle 19 adapted to slide on and be bolted to a plate 20 one on each extremity of the cross-arm support 7. The horn is assembled with the large end up and as it slides in place a stop 21 on the saddle engages the upper edge of the plate 20.

In dismounting the apparatus for the purpose of transportation, the horns are removed, the cross arm support 7 and pintle 8 withdrawn as a unit and placed flat on the platform of the mount and the pedestal 9 is then lowered by means of the hinged base 10 in the opposite direction. A carrier consisting of separate U-shaped frames 22—22 is then placed in sockets 23 located in the four corners of the platform. Each frame is provided with three vertical spring suspended metal straps 24, one on each side and one in the center and secured to the straps are upturned hooks 25 for receiving the side bars 18 of the cradle. When the horns are placed in the carrier they may be further secured by means of centrally disposed straps 26 resiliently attached to the platform of the mount and having downturned hooks 27 for engaging the side bars.

The operation of the apparatus when set-up is according to established principles, two listeners being provided and the readings of the elevation scale 28 and the azimuth scale 29 being preferably made by other members of the crews.

I claim:

1. A sound locating apparatus embodying a wheeled mount, a pedestal hinged to the mount, a cross-arm support and pintle adapted to be mounted as a unit on the pedestal and to be carried on the mount when removed from the pedestal, a plate on each extremity of the cross arm support, a group of horns each including a cradle and saddle for removable attachment to the plate, a carrier including a pair of U-shaped frames securable to the mount and having yielding supports for receiving the horns when dismounted from the cross-arm support.

2. A sound locating apparatus embodying a wheeled mount, a vertical support on the mount adapted to be moved to a horizontal traveling position, a group of horns including means for detachably mounting them on the support and a carrier frame securable to the mount for yieldingly carrying the horns when removed from the support.

HIRAM B. ELY.